United States Patent [19]

Crawford et al.

[11] Patent Number: 4,880,539
[45] Date of Patent: Nov. 14, 1989

[54] FILTER FOR FILTERING SOLIDS OUT OF A LIQUID HAVING A DOCTOR BLADE WIPING MEANS

[75] Inventors: John E. Crawford, Glens Falls; Keith Crofut, Fortedward, both of N.Y.

[73] Assignee: Cellier Corporation, South Natick, Mass.

[21] Appl. No.: 109,431

[22] Filed: Oct. 16, 1987

[51] Int. Cl.⁴ .................... B01D 33/36; B01D 35/16; B01D 35/28; B07B 1/52
[52] U.S. Cl. .................... 210/408; 15/256.5; 162/272; 162/274; 209/381; 209/389; 210/413; 210/415
[58] Field of Search ............ 210/408, 413, 415, 396; 15/246, 256.5; 209/381, 389; 162/272, 274, 251

[56] References Cited

U.S. PATENT DOCUMENTS

| 4,217,220 | 8/1980 | Egli | 210/413 |
| 4,265,705 | 5/1981 | Pyykkönen | 162/272 |
| 4,337,158 | 6/1982 | Bodine | 210/415 |
| 4,663,030 | 5/1987 | Chupka et al. | 162/251 |

Primary Examiner—Steve Alvo

[57] ABSTRACT

A pressurized tank filter for filtering oversized solids from a liquid wherein fluid passes through a filter media on which oversized solids are collected. A doctor blade assembly is provided for biasly engaging the filter and accumulating the solids collected thereon, where upon on each rotation of the doctor blade they engage a wiper means which causes a cleaning thereof.

17 Claims, 4 Drawing Sheets

FILTER FOR FILTERING SOLIDS OUT OF A LIQUID HAVING A DOCTOR BLADE WIPING MEANS

FIELD OF THE INVENTION

The invention relates to a filter, more particularly a filter for filtering a slurry so as to remove oversized contaminants therefrom and removing these contaminants from the filter on a continuous basis.

BACKGROUND OF THE INVENTION

In many industrial processes there is involved the pumping or transfer of liquids for which a desired amount of filtering is required. For example, in the papermaking industry, there is utilized various viscous paper mill coatings in the processing thereof, such coating processes involve recirculation of coating liquid. It is desirable for many of reasons, to filter such a fluid to remove the agglomerated oversized solids and contaminants contained therein. In general, a wide variety of filtering mechanisms exist on the market for providing such filtering. These include those set forth in U.S. Pat. Nos. 2,606,663; 2,627,349; 2,908,390; 3,051,233; 4,217,220; 4,329,230; 4,337,158; and 4,456,530, for example.

As part of the operation of a filter, a means for removing the filtered material from the filter mechanism is typically required as can be seen in the aforenoted patents. Therefore, an effective filter also requires an effective means of collecting and removing the filtered material (oversized solids and contaminants) from the filtered medium. Scrapers, backwashing, etc., are typically involved.

While there are many types of filter arrangements on the market, there exists a need for a filter that provides for effective and efficient handling of the filtered out material (oversized solids and contaminants). Such handling should ensure that the material is effectively removed from the filter on a continuous basis and not be allowed to build up to the extent that it impedes the filter's operation.

SUMMARY OF THE INVENTION

It is therefore a principal object of the invention to provide for a filter for filtering a slurry on a continuous (24 hour/day) basis.

It is another principal of the invention to provide for a filter which provides for a cleaning of the filter media in an effective manner on a continuous 24 hour/day basis.

The present invention provides for a pressurized tank type filter which includes a housing in which is positioned a hollow stationary cylindrical filter media. The slurry is pumped under pressure into the filter. Filtered fluid (filtrate) which passes from inside to outside of the filter media is collected by the housing and is drawn off on a side outlet. The oversized solids which were in the slurry are filtered out and remain on the inside surface of the filter screen. Positioned on the inside of the filter screen is a plurality of blades which are biased via springs into engagement with inside surface of the screen. The blades rotate at an acute angle along the internal circumference of the screen. The blades serve to wipe the screen of the rejected solids. The blades move the rejected solids around the screen surface by trapping the solids in the acute angle formed between the blade and the screen. The blades move the solids along the inside surface of the screen to the blade cleaning mechanism. The blade cleaning mechanism is an obstruction in the path of the blade. It can take many forms, with its purpose to clean the rejected solids from the blade. The blade which is loaded by springs rides up on this obstruction. As the blade continues to travel, the solids are removed from the blade. The blade pivots back into engagement with the screen after being cleaned.

In addition, a vibration mechanism is provided and coupled to the filter screen for vibration thereof to assist in loosening the collected solids from the screen and aiding the blade mechanism in removing the rejected solids.

BRIEF DESCRIPTION OF THE DRAWINGS

Thus by the present invention, its objects and advantages and other will be realized, the description of which will be taken in conjunction with the drawings wherein.

DETAILED DESCRIPTION OF THE PREFERRED EMBODIMENT

Figure 1:
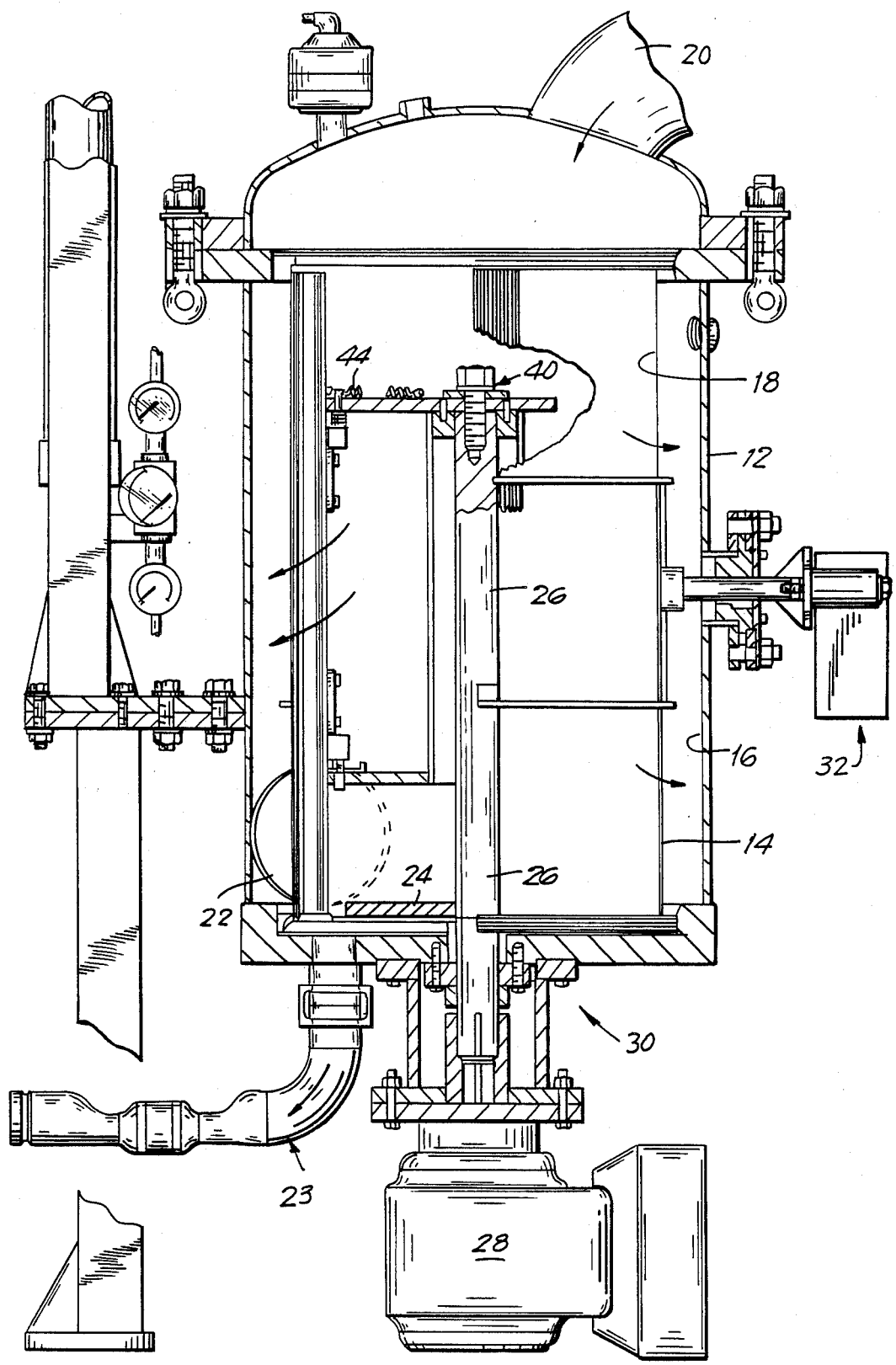
FIG. 1 is a side partially sectional view of the filter, incorporating the teachings of the present invention.

Turning now more particularly to the drawings, there is shown a pressure type single stage filter 10 which is in the shape of a cylindrical tank. The filter 10 includes an outer casing 12 in which a cylindrical filter screen 14 is positioned at a spaced distance (2-3 inches) from the interior surface 16 of casing 12. The filter media 14 includes an inner surface 18 which may be slightly ribbed, etched, woven or scored and is provided with openings which may be horizontal, vertical, etc., which allows for a separation of the oversized solids out of the liquid. The size of the openings will depend upon the particular application and the solids to be collected. In this regard, the slurry is fed into the filter via inlet port 20. The rejected solids are collected on the inside surface of the filter screen 14 through the filtering action thereof with the liquid passing through the filter screen 14 and discharged via outlet port 22. Certain amounts of solids which accumulate will migrate to the bottom of the filter screen 14 by way of gravity where it would be collected by way of a rotating sweep member 24. In this regard, sweep member 24 is coupled to shaft 26. Shaft 26 is axially positioned within the filter screen 14 and coupled at one end to a drive motor 28 positioned outside the casing 12. A suitable sealing arrangement 30 is provided between the shaft 26, motor 28 and casing 12. Note the drive motor 28 may be a direct drive as shown or offset via a belt drive arrangement so as to allow ease of access should the sealing arrangement 30 have to be repaired or replaced. A rotation of the shaft 26 will cause the sweep member 24 to rotate and collect the solids falling to the bottom of the filter screen 14 and discharge out a flush discharge 23.

Figure 1A:
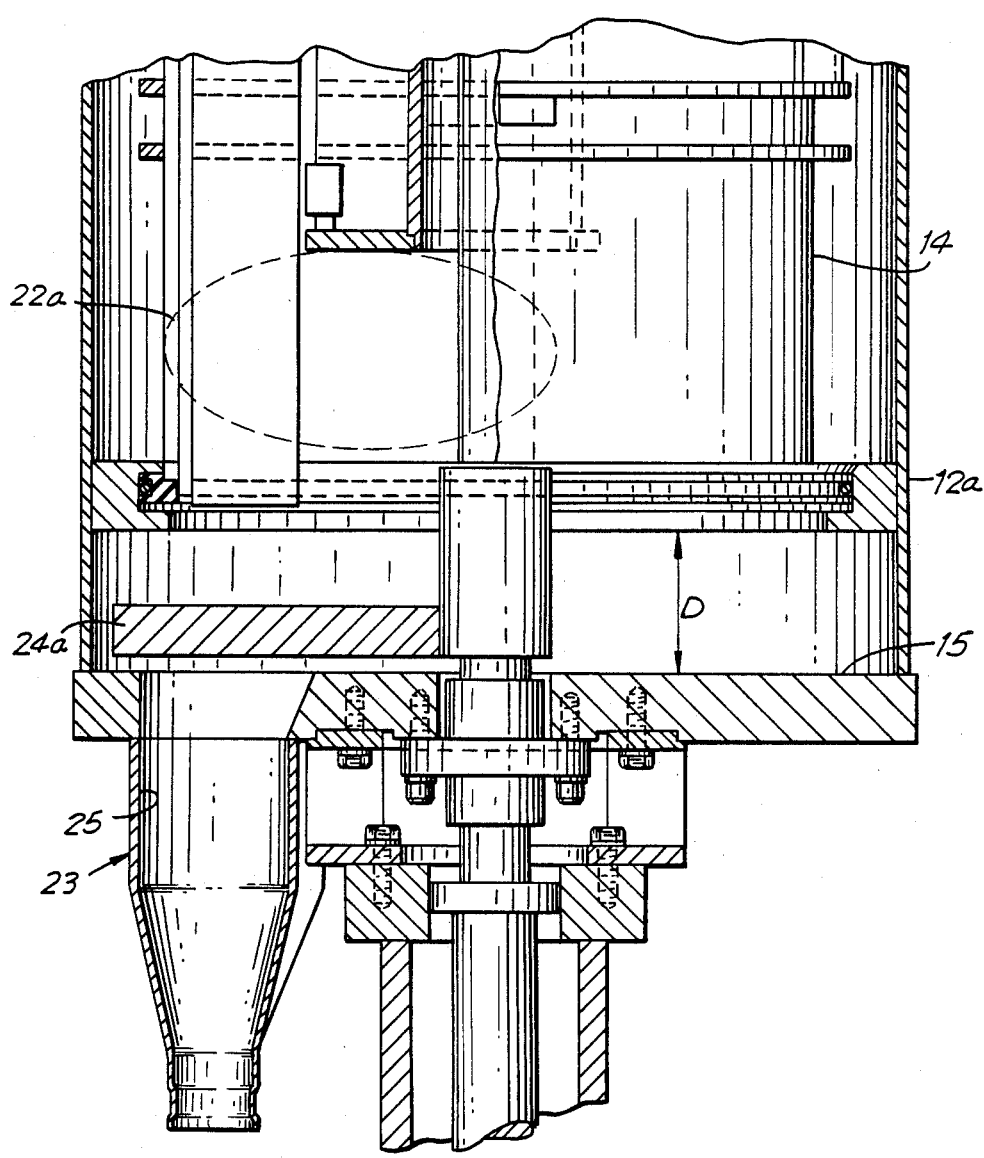
FIG. 1A is a side partially section view of a bottom portion of the filter, incorporating the teachings of the present invention.

An alternative sweep arrangement is shown in FIG. 1A wherein the filter media 14a (like parts similarly numbered with the suffix a) is displaced a certain distance D from the bottom 15 of casing 12a to allow a separate space for the accumulation of solids. The discharge port 22a is providing for the screened liquid having however a kidney shape and the flush discharge 23a for the solids is provided with a kidney shaped reservoir 25 for receiving discharge.

To assist in dislodging the collected solids from the side of the filter screen 14 is a vibration assembly which may be of any type suitable for as that manufactured by Vibco, Inc., P.O. Box 8, Stilson Road, Wyoming, Rhode Island 20898. The vibration assembly 32 serves to vibrate the filter screen 14 which causes the collected solids to migrate to the bottom thereof. It also prevents the solids from blinding the screen, thus aiding the blade removal action.

Figure 2:
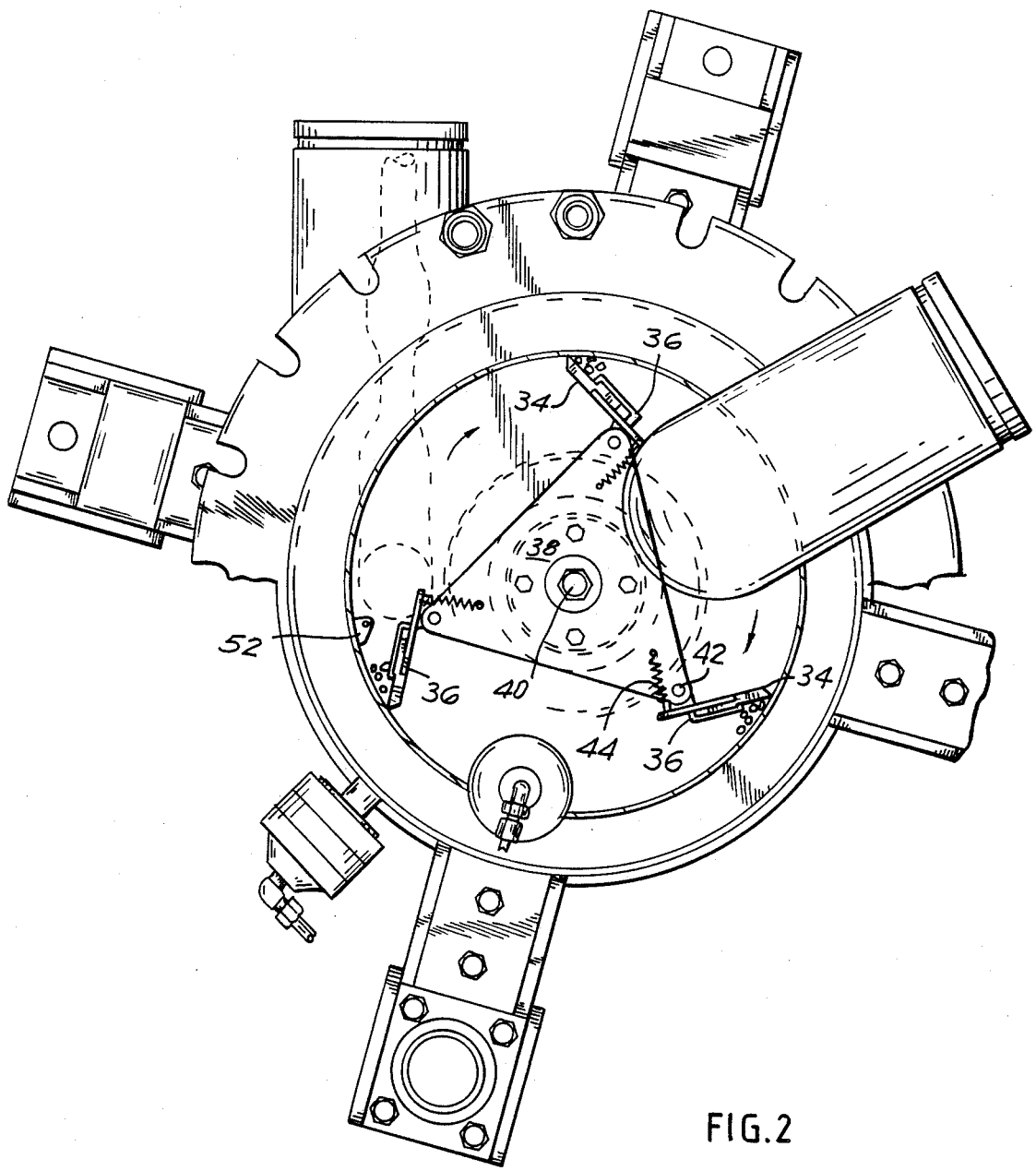
FIG. 2 is a top sectional view of the filter, incorporating the teachings of the present invention.

In addition, and most importantly, the present invention provides for doctor or scraping blade assemblies 34 to be positioned within the filter screen 14. In this regard, as shown in FIG. 2, three doctor blades 36 are pivotably mounted equi-distanced about a blade support 38. The blade support is bolted at 40 to shaft 26 such that the rotation o shaft 26 correspondingly rotates support 38 and in turn the blades 36.

Figure 3A:
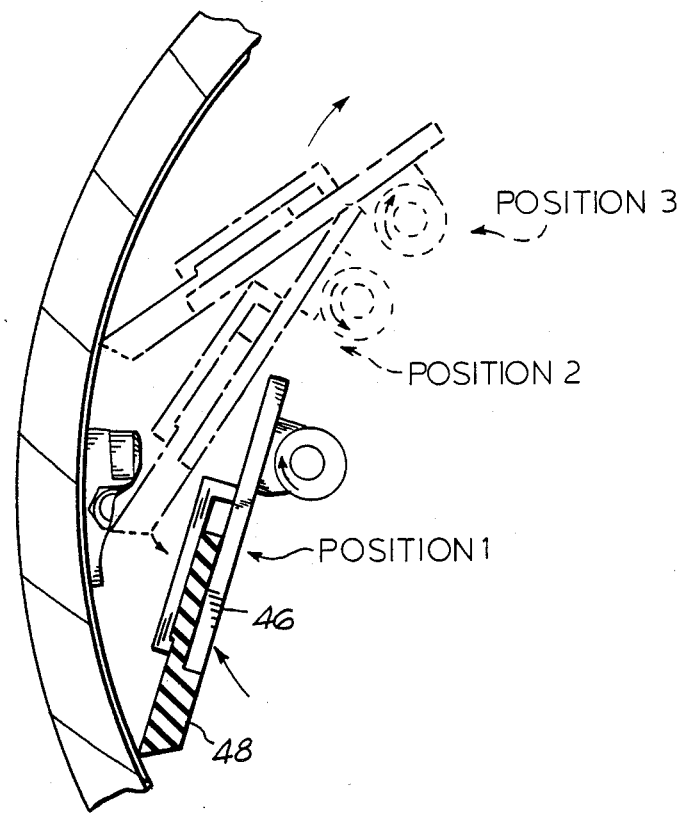
FIG. 3A is a schematic view of the blade assembly as it passes over the wiping device, incorporating the teachings of the present invention.

In this regard, joint 42 provides for pivoting of the doctor blades 36. The blades are spring biased via tension or torsion springs 44 into engagement with the inner surface 18. The doctor blades 36 themselves may comprise a blade holder (See FIG. 3A) in which is secured a blade edge member 48 which are preferably made of rubber, metal or other material suitable for purpose, so as to allow for removal of the blade edge member 48 from time to time, should it become worn.

The doctor blades 36 are somewhat rectangular in shape and extend axially along the entire cylindrical side wall of the filter screen 14. In this regard, a plurality of blade supports 38 would be positioned along shaft 26 so as to provide successive groups of doctor blades 36. These groups of blades rotate (for example at 0.1-10 rpms. the slow speed aids the settling of solid to the bottom) about the circumference of the filter screen 14 and together scrape in a continuous line from essentially top to bottom of the filter screen 14 substantially all of the inner surface of the filter screen 14. The respective blades follow a single path and are in a sense dragged on the screen surface at an acute angle thereto, rather than a forward scraping as heretofore practiced.

Figure 3B:
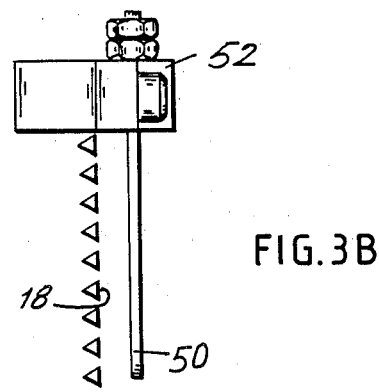
FIG. 3B is a partially sectional view of a portion of the blade wiping mechanism and filter screen, incorporating the teachings of the present invention.

The present invention provides for cleaning the doctor blades once each revolution. In this regard, a blade wiping wire 50 is mounted at opposite ends via mounting means 52 (one shown) to the filter screen from top to bottom thereof. The wire 50 while it may be solid is preferably flexible such as a helically wound metal wire and mounted under tension. The wire 50 is positioned at a spaced distance from the inner surface 18 of the filter screen 14 at perhaps a ¼ inch as shown in FIG. 3B.

The cleaning effect of the blade wire 50 is such that it provides a cleaning of the doctor blades once each rotation thereof. As can best be seen in FIG. 3A, the doctor blade during rotation thereof engages the blade wire 50 which will scrape thereacross, cleaning the collected solids from the blade. The doctor blade is allowed to pivot over the wire since it is on a pivot pin and is spring loaded by torsion springs. The doctor blade continues up and over the wire and returns to engaging the inner surface 18 of the screen. This action in addition to cleaning the doctor blade also causes the accumulated solids to fall to the bottom of the screen. To assist in this regard, in the case of a flexible wire 50 it vibrates due to the contact with the doctor blade which serves to loosen any accumulated solids attached thereto, resulting in their falling to the bottom where they are ultimately swept and discharged. Note, the tension across the wire may be adjusted as desired.

While in the foregoing embodiment it was set forth that the slurry was fed into the center of the filter screen with the flow of liquid outward and the collection of solid on the inside, it should be understood that the present invention is readily adaptable for a reverse flow from outside the filter inward should this be desired. In addition, while the discussion set forth that the blades are rotating, an alternative to this would be rotating the filter media and keeping the blades stationary.

Thus by the present invention, its objects, advantages and others are realized and although a preferred embodiment has been disclosed and described in detail herein, its scope should not be limited thereby, rather its scope should be that in accordance with that of the appended claims.

What is claimed is:

1. A filter for filtering solids out of a liquid comprising:
   a housing for receiving a liquid;
   a cylindrical filter member having a filter surface positioned in said housing for screening oversized solids from a liquid passing through the filter surface which are deposited on the filter surface;
   doctor blade means engaging the filter surface and accumulating solids deposited on said surface through the relative rotation therebetween;
   said doctor blade means including a blade member biased into engagement with said filter surface at an acute angle relative to the direction of movement as between the filter member and the blade means; and
   blade wiping means including a portion spaced at a distance from the filter surface and disposed in the path of travel of said blade member for cleaning the accumulated solids from members at least once each time the blade member travels the circumference of the filter member.

2. The invention in accordance with claim 1 wherein said filter member includes an inner and outer filter surface; said doctor blade means is rotatably positioned within the filter member with the blade member biasly engaging the inner filter surface for accumulating the solids collected thereon.

3. The invention in accordance with claim 2 wherein the doctor blade means rotates with respect to the filter member.

4. The invention in accordance with claim 3 wherein said filter member has a length in the longitudinal direction and said doctor blade includes blade members which extend lengthwise parallel to the center axis of the filter member for engagement with substantially the entire length of the inner surface of the filter means.

5. The invention in accordance with claim 4 which includes a plurality of blade members transversing substantially the entire length of the surface of the filter member.

6. The invention in accordance with claim 5 wherein said doctor blade means comprises successive blade members axially disposed about the circumference of the filter member.

7. The invention in accordance with claim 6 wherein said blade members are spring biased into engagement with the inner surface of the filter member.

8. The invention in accordance with claim 7 wherein said blade wiping means is attached to the inner surface of the filter member in the path of travel of the blade members for engaging said members and causing the accumulated solids to be removed therefrom.

9. The invention in accordance with claim 8 wherein said blade wiping means comprises a wire positioned across the length of the filter member and capable of vibrating upon contact with the blade members.

10. The invention in accordance with claim 9 which includes means for rotating said doctor blade means and in turn said blade members at a speed of between 0.1–10 rpms.

11. The invention in accordance with claim 10 which includes a vibration means coupled to the filter member for the vibration of same to facilitate the loosening of solids collected thereon.

12. The invention in accordance with claim 1 wherein said blade wiping means is positioned on the inner surface of the filter member in the path of travel of the blade members for engaging said members and causing the accumulated solids to be removed therefrom.

13. The invention in accordance with claim 11 wherein said blade wiping means comprises a wire positioned across the length of the filter member along its center axis and capable of vibrating upon contact with the blade members.

14. The invention in accordance with claim 11 wherein the blade wiping means comprises a solid rod positioned across the length of the filter member.

15. The invention in accordance with claim 3 which includes means for rotating said doctor blade means and in turn said blade member at a speed of between 0.1–10 rpms.

16. The invention in accordance with claim 1 which includes a vibration means coupled to the filter member for the vibration of same to facilitate the loosening of solids collected thereon.

17. A filter for filtering solids out of a liquid comprising:

a housing for receiving a liquid;

a cylindrical filter member having an inner and outer filter surface positioned in said housing for screening oversized solids from a liquid, which are deposited on the inner filter surface;

doctor blade means mounted so as to engage the inner filter surface for accumulating solids deposited on said inner surface through the relative rotation therebetween;

said doctor blade means rotatably positioned within the filter member and includes a blade member spring biased into engagement with said surface at an acute angle, relative to the direction of movement of the blade means, between the inner filter surface and the blade means and extending lengthwise along the center axis of the filter member so as to engage the inner surface across substantially its entire length; and blade wiping means including a portion spaced a distance from the inner surface and disposed in the path of travel of said blade member and engagable with the entire length of the blade means for cleaning the accumulated solids from such member at least once each time the blade member travels the circumference of the filter member.

* * * * *